US011695601B2

(12) United States Patent
Sudhakaran et al.

(10) Patent No.: US 11,695,601 B2
(45) Date of Patent: Jul. 4, 2023

(54) ON-CHIP VIRTUAL OSCILLOSCOPE USING HIGH-SPEED RECEIVER SAMPLER READBACK

(71) Applicant: NVIDIA Corporation, Santa Clara, CA (US)

(72) Inventors: Sunil Rao Sudhakaran, Brisbane, CA (US); Arash Zargaran-Yazd, San Jose, CA (US); Santhosh Kumar Gude, San Jose, CA (US); Seema Kumar, Santa Clara, CA (US)

(73) Assignee: Nvidia Corporation, Santa Clara, CA (US)

( * ) Notice: Subject to any disclaimer, the term of this patent is extended or adjusted under 35 U.S.C. 154(b) by 0 days.

(21) Appl. No.: 17/402,465

(22) Filed: Aug. 13, 2021

(65) Prior Publication Data
US 2023/0052588 A1    Feb. 16, 2023

(51) Int. Cl.
*H04L 27/02* (2006.01)
*G06F 1/08* (2006.01)

(52) U.S. Cl.
CPC ........... *H04L 27/02* (2013.01); *G06F 1/08* (2013.01)

(58) Field of Classification Search
CPC .................................. H04L 27/02; G06F 1/08
See application file for complete search history.

(56) References Cited

U.S. PATENT DOCUMENTS

| 6,570,523 B1 * | 5/2003 | Bacrania ............... H03M 1/165 341/154 |
| 7,215,721 B2 * | 5/2007 | Hietala ................... H04L 1/004 375/317 |
| 10,659,214 B2 * | 5/2020 | Chattopadhyay ......... H04L 7/06 |
| 2019/0245676 A1 * | 8/2019 | Bai ........................... G06F 1/12 |
| 2021/0248103 A1 * | 8/2021 | Khashaba ............. H04L 7/0087 |

* cited by examiner

*Primary Examiner* — Jean B Corrielus
(74) *Attorney, Agent, or Firm* — Lowenstein Sandler LLP (57) ABSTRACT

A system includes a transmitter to transmit a set of bits associated with signaling having one or more levels. The system includes a receiver coupled to the transmitter, the receiver to receive the set of bits and generate a first plurality of digital values, each digital value generated at a first timing value and a plurality of reference voltages, the reference voltage incremented based at least in part on generating a digital value of the first plurality of digital values. The receiver is to generate a second plurality of digital values at a second timing value and the plurality of reference voltages, the first timing value incremented to the second timing value based at least in part on generating the first plurality of digital values. The system includes a controller to determine an amplitude associated with each the first and second plurality of digital values.

20 Claims, 8 Drawing Sheets

ON-CHIP VIRTUAL OSCILLOSCOPE USING HIGH-SPEED RECEIVER SAMPLER READBACK

TECHNICAL FIELD

At least one embodiment pertains to processing resources used to perform and facilitate high-speed communications. For example, at least one embodiment pertains to technology for utilizing high-speed receiver sampler readback with an on-chip virtual oscilloscope to determine a quality of signals transmitted.

BACKGROUND

Communication systems transmit signals from a transmitter to a receiver via a communication channel or medium (e.g., cables, printed circuit boards, links, wirelessly, etc.) The communication system may employ a modulation scheme (e.g., a non-return-to-zero (NRZ) or a pulse-amplitude modulation (PAM) scheme such as PAM2, PAM4, PAM8, PAM16, etc.) for the transmission of signals from the transmitter to the receiver. Communicating signals between the transmitter and the receiver over the channel or medium results in the need to measure transmitted signals to ensure the signals are correctly received at the receiver. For example, a component of the transmitter or receiver may be defective. Additionally or alternatively, transmitted signals may be measured to determine operating frequencies for a respective communication system. Conventional methods to measure signals may probe signals on transmission lines or conductive lines at the receiver. Such conventional methods may corrupt the signal based on an impedance of the probe or propagation delay of the signal. Other conventional schemes of measuring the signal at the receiver may be costly or time consuming.

BRIEF DESCRIPTION OF DRAWINGS

Various embodiments in accordance with the present disclosure will be described with reference to the drawings, in which.

DETAILED DESCRIPTION

As described above, probing signals between a transmitter and a receiver may corrupt the signal and be impractical. For example, a communication system may include a host device and a memory device coupled via a substrate. In at least one embodiment, the memory device may be an example of a dynamic random-access memory (DRAM). In such embodiments, probing the signal at or in close physical proximity of the memory device may cause the signal to be corrupted—e.g., an impedance or resistance of the probe may affect the signal measured. Additionally or alternatively, probing the signal on a memory die may be difficult. In that, probing close rather than at the memory device may also cause an inaccurate measuring of the signal—e.g., based on distance propagation delays. Without properly measuring signals, performing a diagnosis or making an adjustment to the communication system may be difficult.

Advantageously, aspects of the present disclosure are related to a method for measuring signals at a receiver (e.g., memory device) with an on-chip virtual oscilloscope using a high-speed sampler readback. According to embodiments, the transmitter may transmit a known pattern to the receiver. In some embodiments, the transmitter may transmit a single (e.g., one) level (e.g., two or more levels) signal—e.g., a signal modulated using a non-return-to-zero (NRZ) modulation scheme. In other embodiments, the transmitter may transmit a multi-level signal—e.g., a signal modulated using a PAM2, PAM4, PAM8, PAM16, etc., modulation scheme. The receiver may generate digital sequences by sampling portions of the pattern received. In an embodiment, the receiver may generate the digital sequences by sweeping a reference voltage and/or timing at samplers of the receiver. For example, the receiver may increment reference voltages based on a predetermined algorithm at a respective timing value—e.g., phase of the receiver's clock or at a respective time based on a phase interpolator (PI) code. In some embodiments, the receiver may sweep the timing values (e.g., sweep the phase based on the phase interpolator code) and sweep the reference voltages at a second phase. The receiver may continue to sweep the timing and sweep through each reference voltage at each respective time value. In some embodiments, the receiver (or a controller, finite state machine (FSM), control flow unit, decoder, etc., coupled with the receiver) may determine an amplitude of the signal at the receiver at each timing value. By accurately determining the signal's amplitude at the receiver, diagnosing the communication system may be more accurate—e.g., finding a defect or a maximum operating frequency of the receiver. Additionally or alternatively, determining the signal amplitude may allow a user to adjust frequencies or other aspects of the communication system.

Figure 1A:
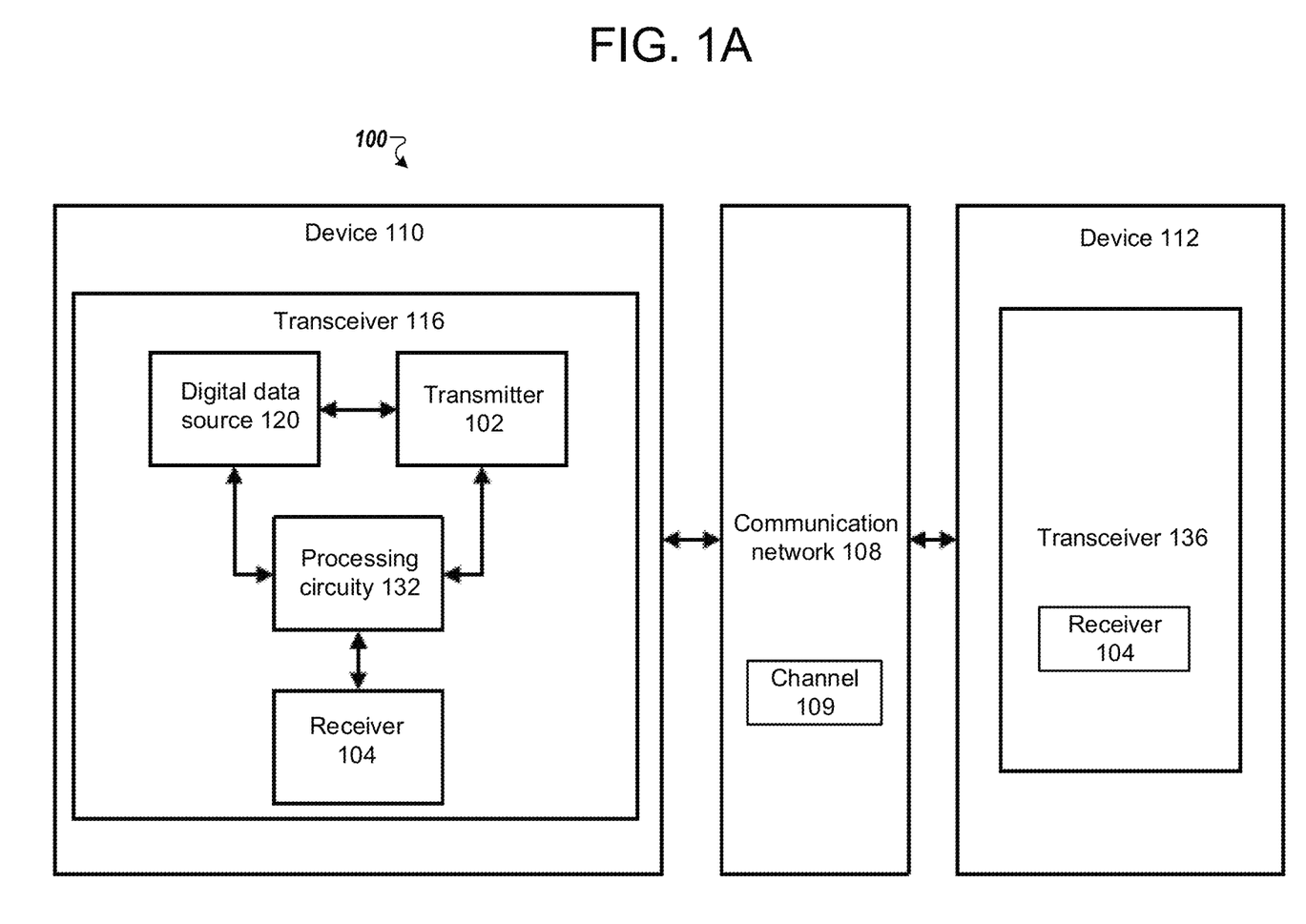
FIG. 1A illustrates an example communication system, in accordance with at least some embodiments.

FIG. 1A illustrates an example communication system 100 according to at least one example embodiment. The system 100 includes a device 110, a communication network 108 including a communication channel 109, and a device 112. In at least one example embodiment, devices 110 and 112 correspond to one or more of a Personal Computer (PC), a laptop, a tablet, a smartphone, a server, a collection of servers, or the like. In some embodiments, the devices 110 and 112 may correspond to any appropriate type of device that communicates with other devices connected to a common type of communication network 108. According to embodiments, the receiver 104 of devices 110 or 112 may correspond to a graphics processing unit (GPU), a switch (e.g., a high-speed network switch), a network adapter, a central processing unit (CPU), a memory device, an input/output (I/O) device, other peripheral devices or components on a system on-chip (SoC), or other devices and components at which a signal is received or measured, etc. As another specific but non-limiting example, the devices 110 and 112 may correspond to servers offering information resources, services, and/or applications to user devices, client devices, or other hosts in the system 100. In an embodiment, the device 112 may correspond to a DRAM memory device. In such an embodiment, a repeating pattern may be received and used to characterize the GPU receiver's response.

Examples of the communication network 108 that may be used to connect the devices 110 and 112 include an Internet Protocol (IP) network, an Ethernet network, an InfiniBand (IB) network, a Fibre Channel network, the Internet, a cellular communication network, a wireless communication network, combinations thereof (e.g., Fibre Channel over Ethernet), variants thereof, and/or the like. In one specific but non-limiting example, the communication network 108 is a network that enables data transmission between the devices 110 and 112 using data signals (e.g., digital, optical, wireless signals).

The device 110 includes a transceiver 116 for sending and receiving signals, for example, data signals. The data signals may be digital or optical signals modulated with data or other suitable signals for carrying data.

The transceiver 116 may include a digital data source 120, a transmitter 102, a receiver 104, and processing circuitry 132 that controls the transceiver 116. The digital data source 120 may include suitable hardware and/or software for outputting data in a digital format (e.g., in binary code and/or thermometer code). The digital data output by the digital data source 120 may be retrieved from memory (not illustrated) or generated according to input (e.g., user input).

The transmitter 124 includes suitable software and/or hardware for receiving digital data from the digital data source 120 and outputting data signals according to the digital data for transmission over the communication network 108 to a receiver 104 of device 112. Additional details of the structure of the transmitter 124 are discussed in more detail below with reference to the figures.

The receiver 104 of device 110 and 112 may include suitable hardware and/or software for receiving signals, such as data signals from the communication network 108. For example, the receiver 104 may include components for receiving processing signals to extract the data for storing in a memory, as described in detail below with respect to FIG. 1B-FIG. 4.

The processing circuitry 132 may comprise software, hardware, or a combination thereof. For example, the processing circuitry 132 may include a memory including executable instructions and a processor (e.g., a microprocessor) that executes the instructions on the memory. The memory may correspond to any suitable type of memory device or collection of memory devices configured to store instructions. Non-limiting examples of suitable memory devices that may be used include Flash memory, Random Access Memory (RAM), Read Only Memory (ROM), variants thereof, combinations thereof, or the like. In some embodiments, the memory and processor may be integrated into a common device (e.g., a microprocessor may include integrated memory). Additionally or alternatively, the processing circuitry 132 may comprise hardware, such as an application-specific integrated circuit (ASIC). Other non-limiting examples of the processing circuitry 132 include an Integrated Circuit (IC) chip, a Central Processing Unit (CPU), a General Processing Unit (GPU), a microprocessor, a Field Programmable Gate Array (FPGA), a collection of logic gates or transistors, resistors, capacitors, inductors, diodes, or the like. Some or all of the processing circuitry 132 may be provided on a Printed Circuit Board (PCB) or collection of PCBs. It should be appreciated that any appropriate type of electrical component or collection of electrical components may be suitable for inclusion in the processing circuitry 132. The processing circuitry 132 may send and/or receive signals to and/or from other elements of the transceiver 116 to control the overall operation of the transceiver 116.

The transceiver 116 or selected elements of the transceiver 116 may take the form of a pluggable card or controller for the device 110. For example, the transceiver 116 or selected elements of the transceiver 116 may be implemented on a network interface card (NIC).

The device 112 may include a transceiver 136 for sending and receiving signals, for example, data signals over a channel 109 of the communication network 108. The same or similar structure of the transceiver 116 may be applied to transceiver 136, and thus, the structure of transceiver 136 is not described separately.

Although not explicitly shown, it should be appreciated that devices 110 and 112 and the transceivers 116 and 120 may include other processing devices, storage devices, and/or communication interfaces generally associated with computing tasks, such as sending and receiving data.

Figure 1B:
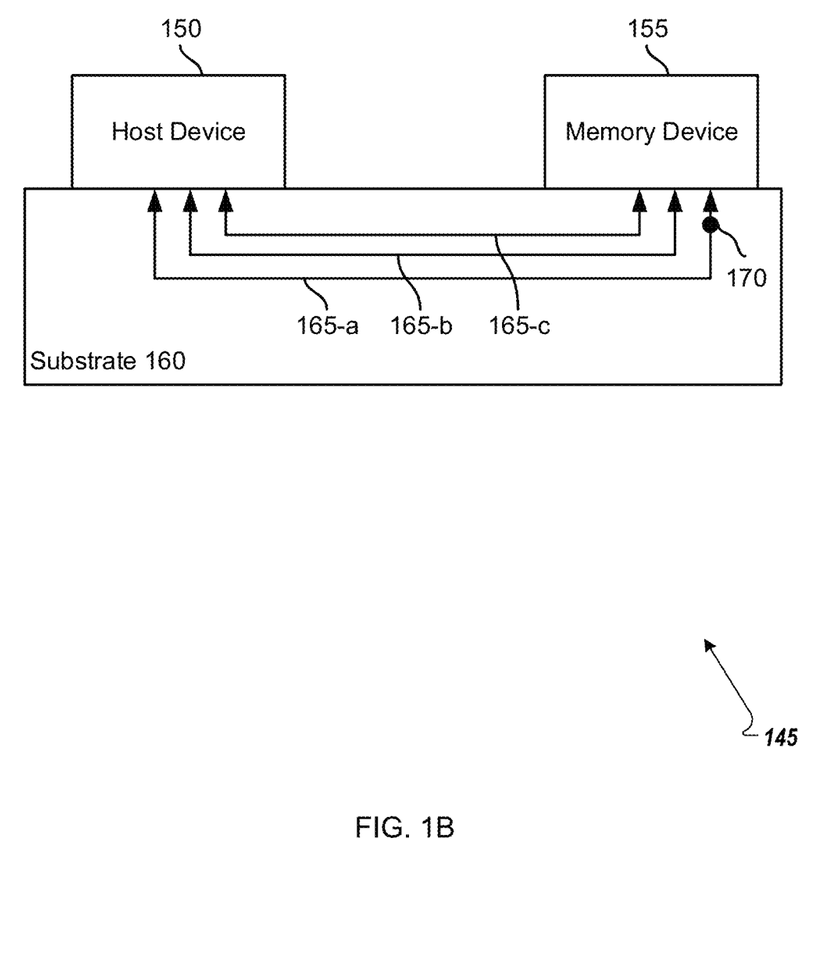
FIG. 1B illustrates a block diagram of an exemplary communication system employing an on-chip virtual oscilloscope using a high-speed receiver sampler readback, in accordance with at least some embodiments.

FIG. 1B illustrates a block diagram of an exemplary communication system 145 communicating signals between a transmitter and a receiver. In some embodiments, communication system 145 may be an example of communication system 100. Communication system 145 may include a host device 150, a memory device 155, a substrate 160, and conductive lines 165 coupling the host device 150 and the memory device 155. In one embodiment, host device 150 and memory device 155 may be examples of devices 110 and 112. In one embodiment, substrate 160 may be an example of the communication network 108.

Host device 150 may be configured to transmit functions, commands (e.g., access commands, read commands, write commands, etc.), instructions, data, etc., to memory device 155. In some examples, host device 150 may be configured to utilize a modulation scheme with respect to the transmission of a signal (e.g., digitally encoded data) to the memory device 155. In an embodiment, the host device 150 may use a single-level modulation scheme—e.g., a modulation scheme having one level. For example, the host device 150 may use a non-return-to-zero (NRZ) modulation scheme—e.g., the transmitted data symbols consist of symbols −1 and 1, with each symbol value representing a binary bit. In some examples, the NRZ scheme is also known as a PAM level-2 or PAM2 system as there are 2 unique values of transmitted symbols. Typically a binary bit 0 is encoded as −1, and a binary bit 1 is encoded as 1 as the PAM2 values. In at least one embodiment, the host device 150 may be configured to use a multi-level modulation scheme—e.g., a modulation scheme having two or more levels. For example, the host device 150 may use a PAM4 modulation scheme that uses four (4) unique values of transmitted symbols to achieve higher efficiency and performance. The four levels are denoted by symbol values −3, −1, 1, 3, with each symbol representing a corresponding unique combination of binary bits (e.g., 00, 01, 10, 11). It is noted that while the use of the NRZ or PAM4 modulation scheme is described herein by way of example, other data modulation schemes can be used in accordance with embodiments of the present disclosure, including for example, PAM8, PAM16, etc.

Memory device 155 may be configured to store data for host device 150. In an embodiment, memory device 155 may be configured to execute commands, instructions, functions, etc., based on signals received from the host device 150. In an embodiment, memory device 155 may be an example of a dynamic random-access memory (DRAM). In an embodiment, the DRAM memory device 155 may be on a chip—e.g., memory device 155 may be referred to as a chip. In such examples, the memory device 155 may also include individual memory die (e.g., rows and columns of memory cells) on the chip. It is noted that while the use of a DRAM device is described herein by way of example, other memory devices can be used in accordance with the present disclosure, including for example an SRAM device, flash memory device, or other memory devices.

Substrate 160 may be configured to couple the host device 150 with memory device 155. Substrate 160 may be an example of a PCB or an organic package. Substrate 160 may include conductive lines 165. In an embodiment, conductive lines 165 may be configured to transmit signals between the host device 150 and memory device 155. In an embodiment, a respective conductive line 165 may couple with a respective data (DQ) pin of memory device 155. For example, conductive line 165-a may couple with a first DQ pin, and conductive line 165-b may couple with a second DQ pin. It should be noted that three (3) conductive lines 165 are illustrated by way of example, and communication system 145 may include more than or less than three (3) conductive lines 165 and accordingly, more than or less than three DQ pins—e.g., the memory device 155 may have a plurality of DQ pins.

Although not explicitly shown, it should be appreciated that host device 150, memory device 155, and substrate 160 may include other processing devices, storage devices, and/or communication interfaces generally associated with computing tasks, such as sending and receiving data.

In an embodiment, probing the signals transmitted to the memory device 155 at a location 170 may corrupt the signals transmitted. For example, an impedance or resistance of the probing system may affect the signal transmitted. Accordingly, aspects of the present disclosure are related to a method for measuring signals at the memory device with an on-chip virtual oscilloscope using a high-speed sampler readback at a receiver of the memory device. Measuring the signals at the memory device 155 enables a user to diagnose and determine errors associated with the memory device 155, determine parameters of the memory device 155, and make adjustments to improve signaling between the host device 150 and memory device 155. Aspects of the on-chip virtual oscilloscope using a high-speed sampler readback are described in greater detail with respect to FIG. 2 and FIG. 3.

Figure 2:
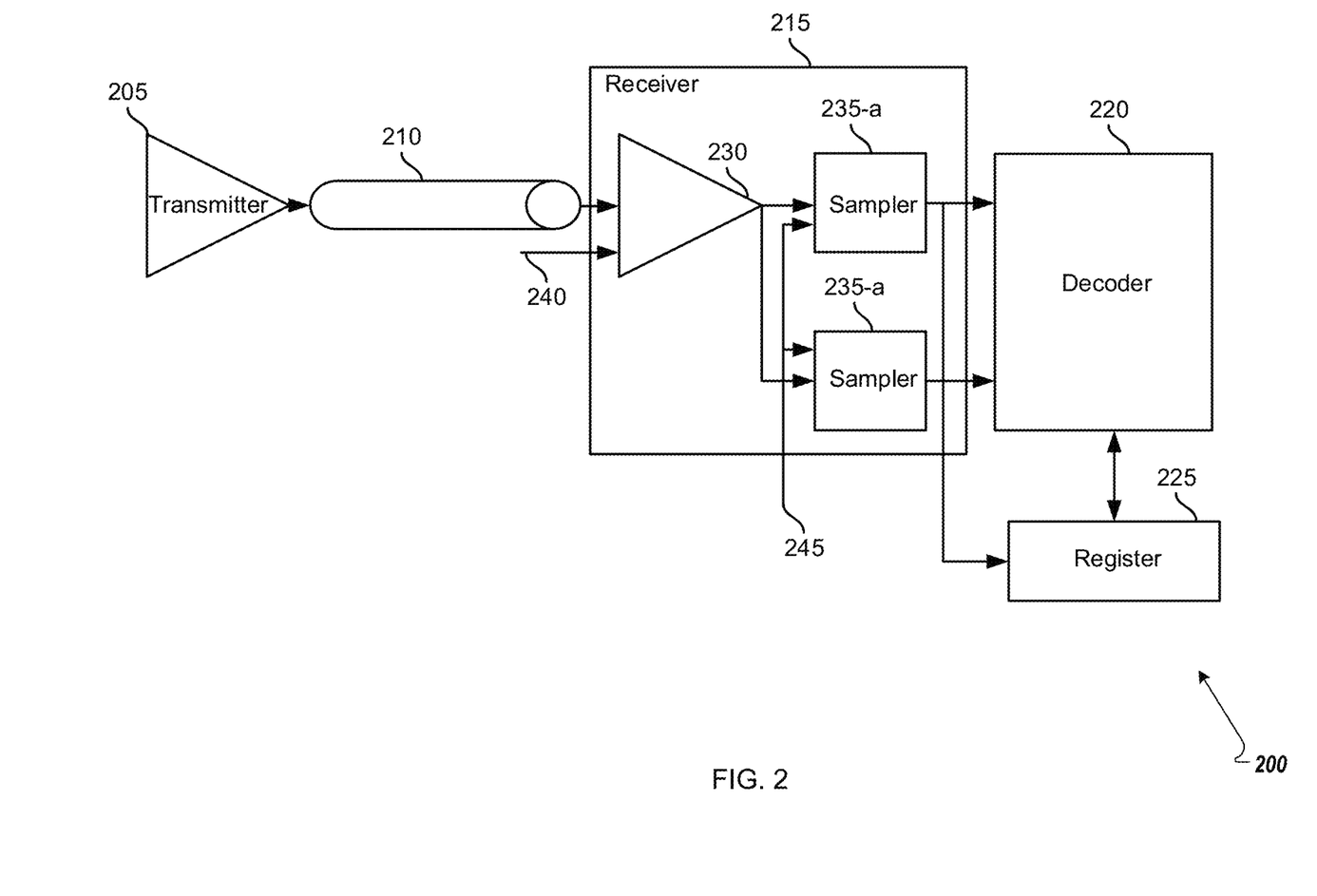
FIG. 2 illustrates a device including an on-chip virtual oscilloscope using a high-speed receiver sampler readback, in accordance with at least some embodiments.

FIG. 2 illustrates a device 200 including an on-chip virtual oscilloscope using a high-speed receiver sampler readback. In an embodiment, device 200 is an example of communication system 100 and/or communication system 145. Device 200 may include a transmitter 205, conductive line 210, receiver 215, decoder 220, and a register 225. Receiver 215 may include a receiving portion 230 and one or more samplers 235. In an embodiment, receiver 215 may receive or generate a reference voltage 240 and a timing value (e.g., timing code, phase interpolator code) 245.

Transmitter 205 may be configured to transmit signals to the receiver 215. In an embodiment, the transmitter 205 may transmit a digital output that comprises a set of bits. In some examples, device 200 may be in a training mode or test mode. In such examples, transmitter 205 may transmit a desired pattern to the receiver 215—e.g., to test or determine signal integrity. For example, the transmitter 205 may transmit a step response pattern, a pulse response pattern, a random pattern, etc. In some embodiments, transmitter 205 may be configured to transmit single-level signaling. In such examples, the transmitter 205 may use NRZ or PAM2 modulation schemes. In some examples, transmitter 205 may be configured to transmit multi-level signaling. In such examples, the transmitter 205 may use PAM4, PAM8, PAM16, etc. In at least one embodiment, transmitter 205 may be located in the host device 150 as described with reference to FIG. 1B.

Conductive line 210 may be configured to transmit signals between transmitter 205 and receiver 215. In some examples, conductive line 210 may be within the substrate 160 as described with reference to FIG. 1B. It is noted that one (1) conductive line 210 is described herein by way of example, and device 200 may include two (2) or more conductive lines 210.

Receiver 215 may be configured to receive signals from transmitter 205. In some embodiments, receiver 215 may be at the memory device 155 as described with reference to FIG. 1B. Receiver 215 may be configured to generate digital sequences based on receiving the pattern from the transmitter 205—e.g., recover or reconstruct a digital pattern representing the pattern transmitted by transmitter 205. In that, receiver 215 may receive raw data (e.g., the set of bits), generate samples from the raw data, process the samples and digital values generated, and generate a second pattern (e.g., FIG. 3B) that corresponds to the pattern transmitted by the transmitter 205. For example, receiver 215 may generate digital values from portions of the set of bits received at one or more samplers 235—e.g., convert analog patterns into digital signals for each sample generated. In some examples, a quantity "N" of samplers 235 utilized by the receiver to generate the digital values and sequences may be based on a quantity of levels "M" of the signal transmitted by the transmitter 205. In some embodiments, the receiver 215 may use "N" samplers 235 based on an equation N=M−1. For example, if the transmitter 205 transmits a PAM4 signal (e.g., four (4) levels), the receiver may utilize three (3) samplers—e.g., 4−1. In an embodiment, samplers 235 may be circuits configured to generate the digital sequences based on receiving the reference voltage 240 and timing value 245—e.g., samplers 235 may be hardware implemented in the receiver 215.

In some embodiments, the receiver 215 may generate the digital sequences based on a reference voltage 240 and a timing value 245 in addition to the set of bits received. For example, the receiver 215 may receive a timing value 245. In some embodiments, the timing value 245 may be based on a phase interpolator code. In some examples, the timing value 245 may correspond to a phase of a clock of the receiver—e.g., a phase at which the samplers 235 sample the set of bits received from the transmitter. For example, receiver 215 may receive a first timing value. In some examples, at the first timing value, the receiver 215 may sweep reference voltage 240. In some examples, reference voltage 240 is received from transmitter 205 along with the set of bits. In other examples, reference voltage 240 is generated by the receiver 215. In an embodiment, receiver 215 may sample the set of bits at sampler 235 at the first timing value and a first reference voltage 240 and generate a first digital value based on the first timing value 245 and first reference voltage 240. The receiver 215 may then increment the reference voltage 240 to a second reference voltage 240 based on a predetermined algorithm, a reference voltage code, a variable algorithm programmed by a user, etc. Subsequent to incrementing to the second reference voltage 240, the receiver 215 may sample the set of bits at the first timing value 245 and the second reference voltage 240. The receiver 215 may continue to increment the reference voltage 240 based on the predetermined algorithm. In some examples, there may be 48 different reference voltage 240 values the receiver sweeps through at the first timing value 245. In an embodiment, the receiver 215 may generate a digital value for each reference voltage 240—e.g., 48 digital values for each timing value 245. In some embodiments, the receiver 215 may be configured to output the generated digital values to the register 225—e.g., the raw sampler data may be stored at the register 225. In other embodiments, the receiver 215 may be configured to output the generated digital values to decoder 220. In an embodiment, the receiver 215 may sweep through the reference voltages 240 in a descending order—e.g., the receiver 215 may decrement from the first reference voltage 240 to the second reference voltages 240. In some examples, the receiver 215 may change the reference voltages 240 in a sequential pattern—e.g., a random pattern or based on a predetermined algorithm. For example, the receiver 215 may sweep through a portion of the reference voltages 240 based on a particular diagnostic—e.g., sweep through a first reference voltage 240, a fifth reference voltage 240, and a tenth reference voltages 240 instead of through all 48 values.

Figure 3A:
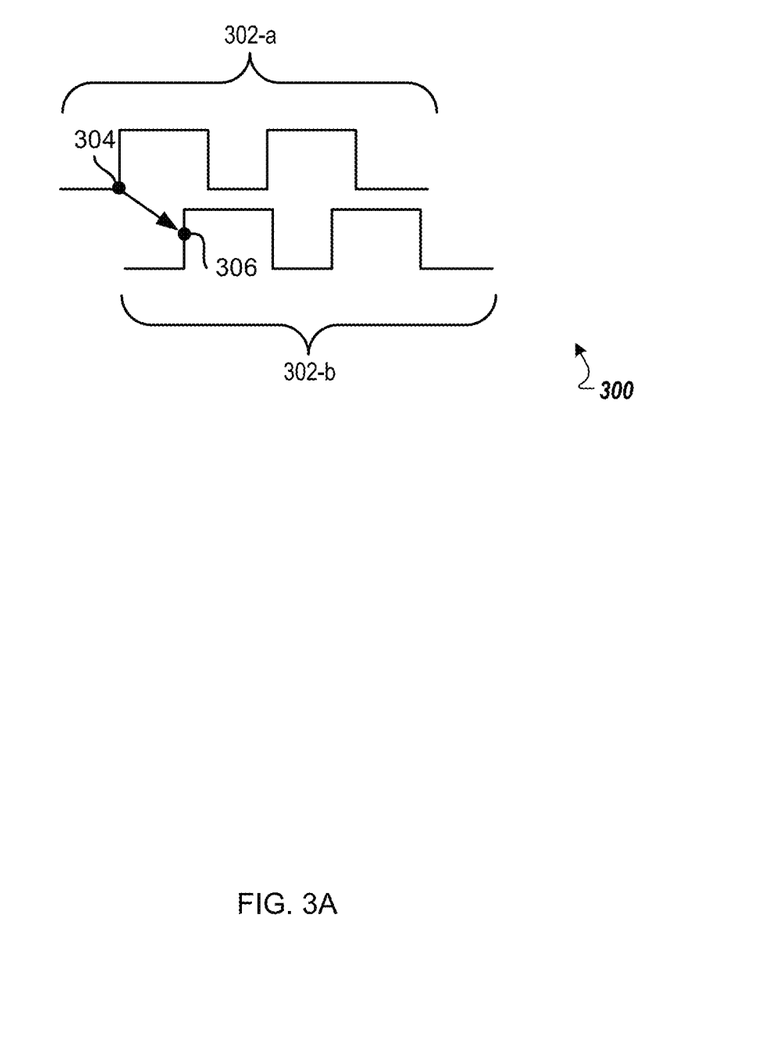
FIGS. 3A, 3B, and 3C illustrate diagrams of timing and signal amplitudes for a system including an on-chip virtual oscilloscope using a high-speed receiver sampler readback, in accordance with at least some embodiments.

In some embodiments, after sweeping through reference voltages 240 at the first timing value, the receiver 215 may be configured to increment the first timing value 245—e.g., the receiver 215 may also sweep the timing values 245. For example, the receiver 215 may increment the timing value from the first value to a second value based on a timing code or phase interpolator code. Diagram 300 of FIG. 3A illustrates an example of sweeping the timing value 245 at the receiver 215. For example, the first timing value 245 may be associated with timing 304, and the second timing value 245 may be associated with second timing 306. In some examples, timing 304 may be at a start of a rising edge of the receiver 215 clock—e.g., before the signal transitions from a low state to a high state. When the receiver 215 increments to the second timing value 245, the second timing 306 may be at a time during the rising edge of the receiver 215 clock—e.g., during a duration in which the signal transitions from the low state to the high state. That is, the timing 306 may be at a different phase of the receiver clock. In some examples, the receiver 215 may sweep through the reference voltage values 240 and generate a digital value for each reference voltage value 240 at the second timing value 245—e.g., sweep through the 48 reference voltage values 245 and generate the digital values at the second timing value. In such examples, the receiver 215 may then increment the timing value 245 to a third timing value 245 after sweeping through the reference voltage values 240 at the second timing value 245. In some examples, the receiver 215 may continue to increment the timing value 245 after sweeping through each reference voltage value 240 based on the phase interpolator code. In an embodiment, the timing value 245 is swept through a quantity of unit intervals (UI) (e.g., a pulse time or symbol duration time) based on a type of modulation scheme used by the transmitter 205. For example, the receiver 215 may sweep through less timing values 245 based on a greater quantity of levels used in the modulation scheme. In some examples, if the transmitter 205 utilizes an NRZ modulation scheme, the receiver 215 may sweep through forty (40) UIs. In some embodiments, if the transmitter 205 is utilizing a PAM4 modulation scheme, the receiver 215 may sweep through twenty (20) UIs. The sampling data over the UIs may be stored at the register 225. In some examples, the receiver 215 may sweep through 64 timing values 245. Accordingly, the receiver may generate 3072 digital values. In some embodiments, generating the digital values may enable the device 100 to characterize the receive response—e.g., characterize the GPU receiver response.

Figure 3B:
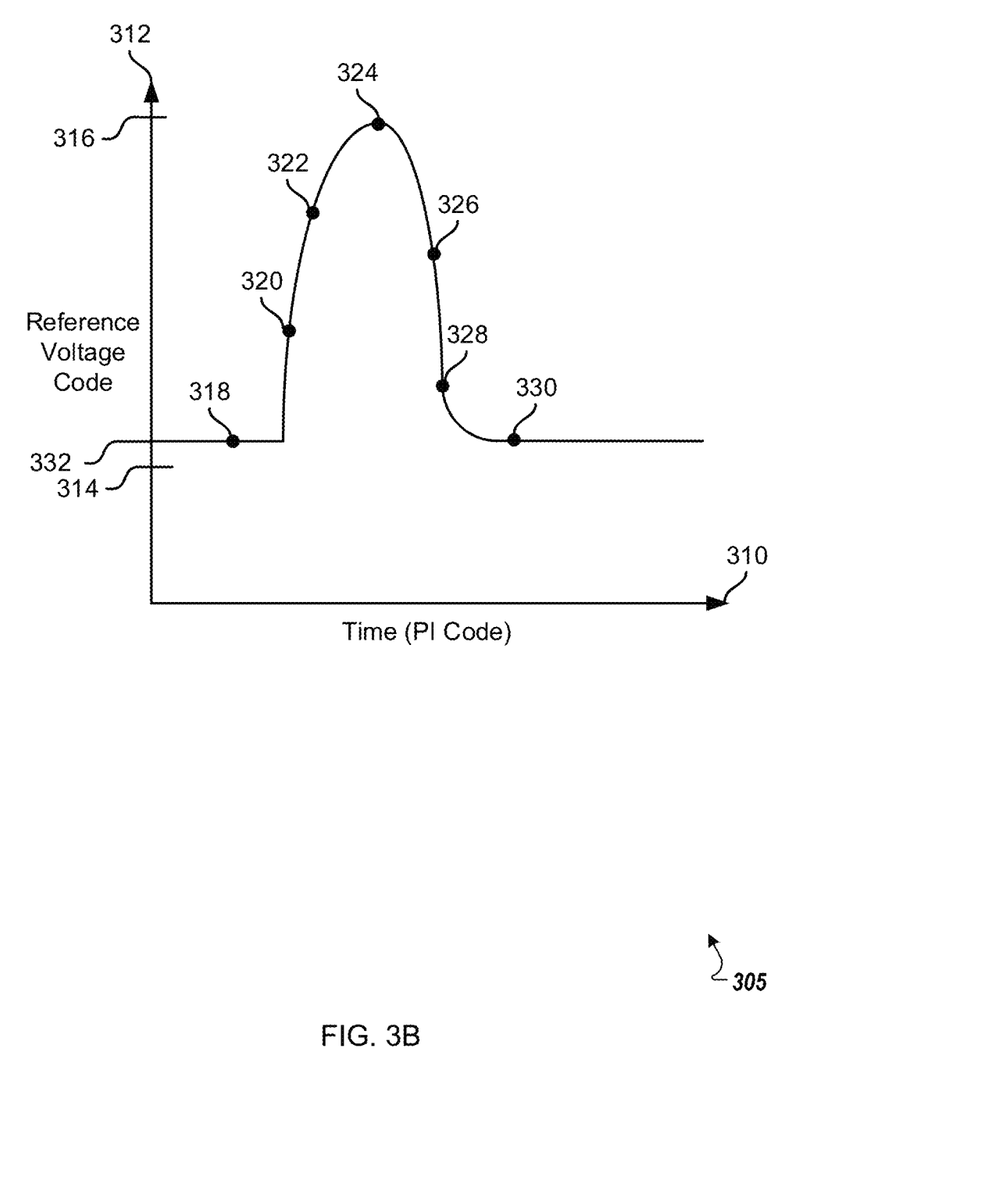

Decoder 220 (e.g., a controller, FSM, control flow unit, processing logic etc.) may be configured to decode the generated digital value—e.g., process the raw data received and the raw sample values to reconstruct the pattern transmitted by the transmitter 205. That is, the decoder 220 may generate a second pattern after processing the sample values stored at the register 225. In some embodiments, the second pattern from the processed digital values corresponds to the raw pattern received by the receiver 215 based on sampling the set of bits received. In some examples, decoder 220 may determine an amplitude (e.g., a magnitude) of the signal transmitted by the transmitter 205 at each timing value 245. Diagram 305 of FIG. 3B illustrates an example of determining the amplitude at each timing value 245. The x-axis 312 of diagram 305 illustrates reference voltage value codes, and the y-axis 310 illustrates timing values (e.g., PI code values). The decoder 220 may be configured to determine the amplitude at each timing value based on when the receiver or sampler 335 transitions or flips states at a given reference voltage code. For example, at a timing value 318, the decoder 220 may determine the sampler 235 transitioned from a first state to a second state at a reference voltage code 332. For example, reference voltage code 332 may correspond to 0.5 volts. If the signal received from the transmitter 205 is less than 0.5 volts, the sampler 235 may output a first logic state, and if the signal is greater than 0.5 volts, the sampler 235 may output a second logic state. Accordingly, the decoder 220 may determine the reference voltage code 332 corresponds to an amplitude of the signal transmitted by the transmitter 205 at the timing value 318 based on the sampler 235 transitioning from the first logic state to the second logic state at reference voltage code 332. In some embodiments, the decoder 220 may determine the average amplitude of the signal at a given timing value 245. In such embodiments, the samplers 235 may sweep through the reference voltages 245 multiple times at the given timing value 245. Accordingly, the decoder 220 may determine the average reference voltage code is associated with the amplitude of the signal at the respective timing value 245—e.g., the decoder 220 may sweep through the reference voltages 245 five (5) times and determine an average reference voltage 245 at which the sampler 235 transitions from the first state to the second state.

In some embodiments, based on determining the average amplitude of the signal, a controller coupled with the receiver 215 and decoder 220 (or the decoder 220 itself) may compute the diagram 305—e.g., hardware components of the memory device 155 may process the various amplitudes and generate a diagram 305. In some embodiments, the hardware computing and processing of the amplitudes to generate diagram 305 may be referred to as a virtual oscilloscope. In some examples, based on determining the amplitudes, the memory device 155, communication system 100 or 145 may perform diagnostics or make adjustments on components in the communication system 100 or 145. In some embodiments, generating the diagram 305 or determining the amplitude of the signal may enable the device 100 to characterize a response of the receiver—e.g., characterizing the GPU receiver response using the sampling data at the various voltage references and timing values (e.g., PI code values).

For example, in an embodiment, the device 200 may determine a quality of the signal transmitted (e.g., signal integrity (SI)). In such examples, the device 200 may perform measurements as outlined herein to generate several diagrams 305 for various signal levels (e.g., power levels) and transitions between the signal levels based on the type of modulation scheme. For example, for NRZ modulated signals, the device 200 may measure transitions between the first state and the second state. In other examples, for PAM4 modulated signals, device 200 may measure transitions between a set of four states. Accordingly, the device 200 may generate an eye pattern (e.g., eye capture) and determine signal integrity based on the synchronization of clocks and a distance between the upper and lower limits of the eye pattern. In an embodiment, the eye pattern (e.g., eye pattern) may be generated over an "n" quantity of UI based on the type of modulation scheme—e.g., over 20 UI for PAM4 and 40 UI for NRZ modulation schemes.

In some examples, the device 200 may detect an error based on determining the signal amplitude and the signal integrity. For example, the device 200 may determine a clock is asynchronous or a given component is failing to receive a signal at a respective voltage level. In other embodiments, the device 200 may perform diagnostics based on determining the signal amplitude and the signal integrity. For example, the device 200 may determine an optimal operating frequency based on determining the signal amplitude—e.g., a frequency at which signal noise and loss are reduced. Accordingly, a user may use the method described herein to determine an operating frequency for a device 200 during a manufacturing process. In some embodiments, the device 200 may determine a maximum frequency (FMAX) the device 200 may operate at before signal loss or signal noise develops. In an embodiment, a user may determine an optimal frequency for a device 200 after manufacturing based on an age of the device 200—e.g., based on components of device 200 operating efficiently at lower frequencies or having the frequency shift as the device 200 ages. Accordingly, the user may adjust a frequency of the receiver 215 clock or adjust a frequency of a clock at a driver coupled with the receiver based on determining the signal integrity—e.g., adjust a clock frequency of the receiver or driver based on determining the amplitudes of the signal at various timing values 245.

Figure 3C:
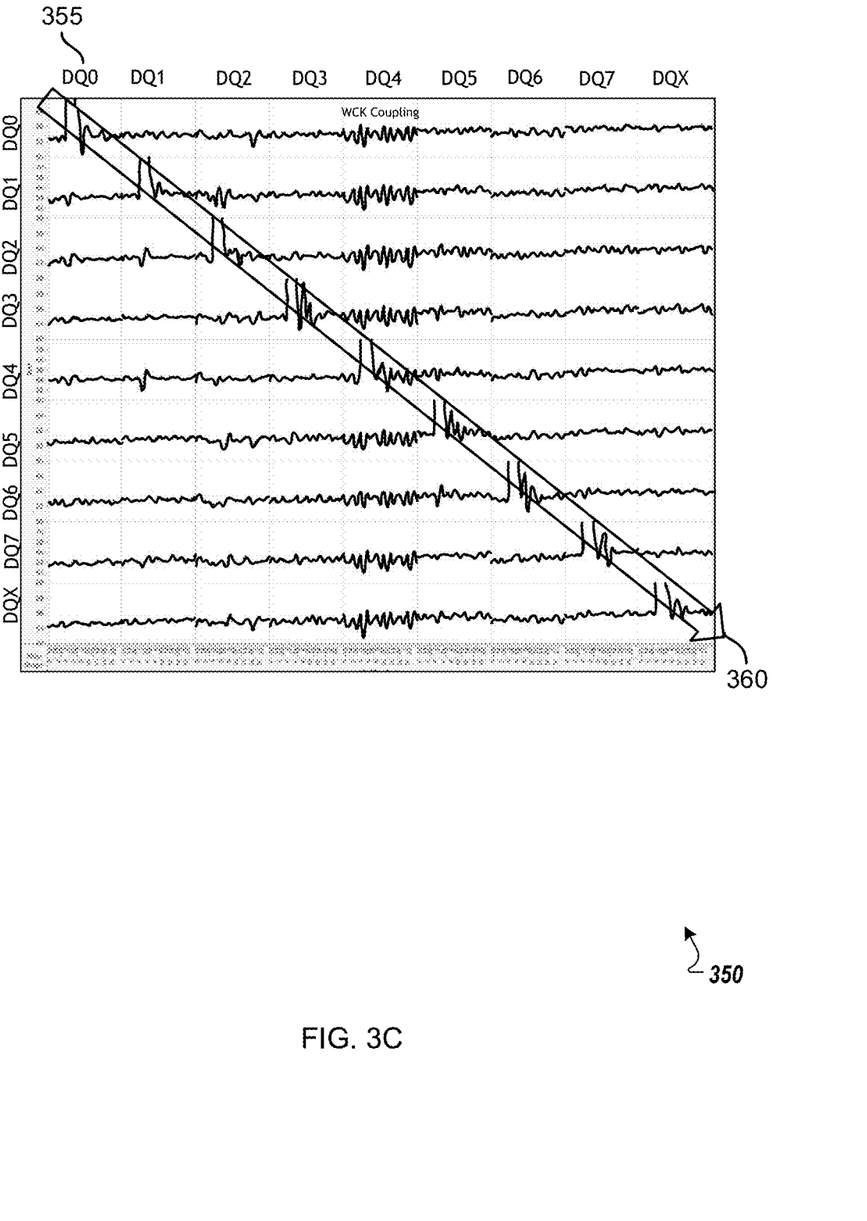

In at least one embodiment, a user may determine SI crosstalk based on determining the signal amplitude in lieu of relying on SI simulation. For example, diagram 350 of FIG. 3C illustrates an example SI crosstalk analysis. Diagram 350 illustrates a signal transmitted from the host device 150 to the memory device 155—e.g., a write clock (WCK). The voltage reference code 245 is swept at each respective data (DQ) pin 355 of the memory device 155 (e.g., at DQ0, DQ 1, DQ2, etc.). In some embodiments, each DQ pin 355 may be coupled with a conductive line 165 as described with reference to FIG. 2. In such examples, disruptions or noise caused by one DQ pin 355 to another DQ pin 355 (e.g., crosstalk) can be computed by determining the amplitude of the signal as described herein at each data pin 355. For example, the device 200 may determine cross talk between a first data pin 355 (e.g., DQ0) coupled with conductive line 165-a and a second data pin 355 (e.g., DQ1) coupled with conductive line 165-b. In such embodiments, the device 200 may determine an amplitude of a first signal transmitted to DQ0 by sweeping timing values 245 and reference voltages 240 while measuring noise at DQ1— e.g., measuring a second signal received at DQ1 based on transmitting the first signal to DQ0. In diagram 305, crosstalk between respective DQ pins 355 may be low as each signal received at the respective DQ pin 355 increases when a signal is sent to it—e.g., along the diagonal arrow 360. In some embodiments, S-parameters (e.g., scattering parameters) may be determined based on the SI crosstalk results.

By determining the signal at the memory device 155 (e.g., on-chip), the signal can be measured more accurately and without consuming additional resources and time.

Figure 4:
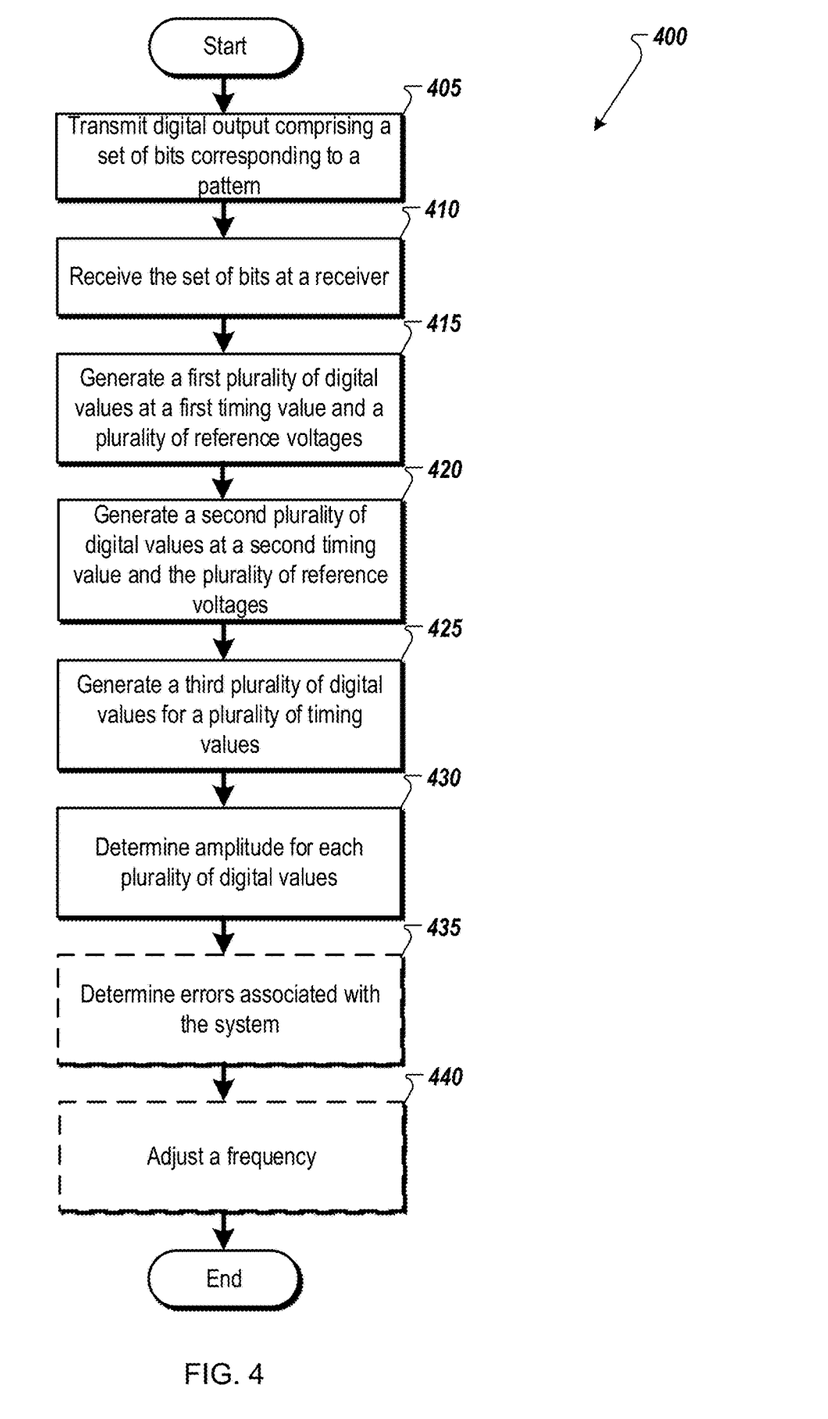
FIG. 4 is a flow diagram of a method for an on-chip virtual oscilloscope using a high-speed sampler readback, in accordance with at least some embodiments.

FIG. 4 illustrates a flow diagram of a method 400 for an on-chip virtual oscilloscope using a high-speed receiver sampler readback. For example, method 400 transmits a known signal (e.g., pattern) to a receiver and generating the signal by sweeping a reference voltage and timing at the receiver. The method 400 can be performed by processing logic comprising hardware, software, firmware, or any combination thereof. In at least one embodiment, the method 400 is performed by device 200, including by transmitter 205, receiver 215, decoder 220, and register 225 as described with reference to FIG. 2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other diagrams illustrating a method to synchronize are possible.

At operation 405, a transmitter (e.g., transmitter 205) may transmit a digital output comprising a set of bits corresponding to a pattern. In an embodiment, the digital output (e.g., signal) corresponds to a single-level signal—e.g., a signal modulated by an NRZ scheme. In an embodiment, the signal corresponds to a multi-level signal—e.g., a signal modulated by a PAM4 scheme. In an embodiment, the pattern corresponds to a pulse response, a step response, or a random pattern. In some examples, the transmitter transmits the pattern during a training or testing mode—e.g., using a training engine where the pattern is a known pattern. In some examples, the transmitter is in a host device (e.g., host device 150).

At operation 410, a receiver (e.g., receiver 215) receives the set of bits corresponding to the pattern. In some examples, the receiver is in a memory device (e.g., memory device 155). In some examples, the receiver may include one or more samplers. In some examples, the receiver may receive the set of bits via a substrate (e.g., substrate 160). In an embodiment, the receiver may receive or generate a reference voltage and receive a timing value. In some embodiments, the timing value is based on a phase interpolator (PI) code.

At operation 415, the receiver may generate a first plurality of digital values at a first timing value and a plurality of reference voltages. In an embodiment, the receiver may generate samples at the one or more samplers from portions of the set of bits at the first timing value and varying reference voltages. For example, the receiver may receive the first timing value and receive (or generate) a first reference voltage of the plurality of reference voltages. In such examples, the receiver may generate a digital value based on sampling the set of bits at the first timing value and first reference voltage. The receiver may then increment the reference voltage from the first reference voltage to a second reference voltage based on a predetermined algorithm. The receiver may then generate a second digital value based on incrementing the reference voltage. In some embodiments, the receiver may continue to increment the reference voltage (e.g., sweep the reference voltage) until the algorithm is satisfied—e.g., based on a maximum quantity of reference voltages. In such embodiments, the receiver may generate a different digital value for each respective reference voltage received or generated.

At operation 420, the receiver may generate a second plurality of digital values at a second timing value and the plurality of reference voltages. In an embodiment, the receiver may increment from the first timing value to the second timing value after generating the first plurality of digital values. In some examples, the receiver may increment to the second timing value based on a phase interpolator code. In some examples, the timing value may correspond to a phase of the clock of the receiver. After incrementing the timing value, the receiver may increment the reference voltages at the second timing value—e.g., generate a digital value of the second plurality of digital values for each reference voltage of the plurality of reference voltages at the second timing.

At operation 425, the receiver may generate a third plurality of digital values for a plurality of timing values. In an embodiment, the receiver may continue to increment the timing values. For example, the receiver may increment the second timing value to a third timing value of the plurality of timing values and sweep the plurality of reference voltages at the third timing. The receiver may then increment to a fourth timing value of the plurality of timing values and sweep the plurality of reference voltages and so forth until all the timing values are incremented according to the PI code. In some examples, a quantity of timing values may be based on a type of modulation scheme. For example, the receiver may store 20 UIs for a PAM4 scheme and 40 UIs for an NRZ scheme. In an embodiment, the receiver may generate multiple digital values for each timing value—e.g., determine an average value. For example, the receiver may sweep the plurality of reference voltages five (5) times at each timing value.

At operation 430, the receiver (or a decoder 220, a controller, FSM, etc.) may determine an amplitude for each plurality of digital values—e.g., for the first plurality of digital values and the second plurality of digital values. In an embodiment, the receiver may generate a signal that corresponds to the pattern transmitted by the transmitter. In such embodiments, the receiver may determine the amplitude of the signal for each timing value. For example, the receiver may determine the average amplitude of the signal at the first timing value by sweeping the plurality of reference voltages multiple times and determining the sampler transitions from a first state to a second state at a respective reference voltage. In some embodiments, the receiver may similarly determine the amplitude of the signal at the remaining timing values.

At operation 435, the receiver or device may determine an error associated with the communication system (e.g., communication system 100 or 145) based on determining the amplitude of the signal. For example, the receiver may determine an error associated with a component of the receiver or an error associated with the transmitter. Additional details of the error associated with the communication system are described with reference to FIGS. 2 and 3.

At operation 440, the device may adjust a frequency of the receiver or driver (e.g., the transmitter) based on determining the amplitude of the signal. For example, the receiver may determine a maximum operation frequency or an optimal operation frequency and adjust the frequency of the receiver or transmitter based on the determination. Additional details of the adjusting the frequency are described with reference to FIGS. 2 and 3. By utilizing the method 400, the device may measure the signal transmitted more accurately without consuming additional resources.

Figure 5:
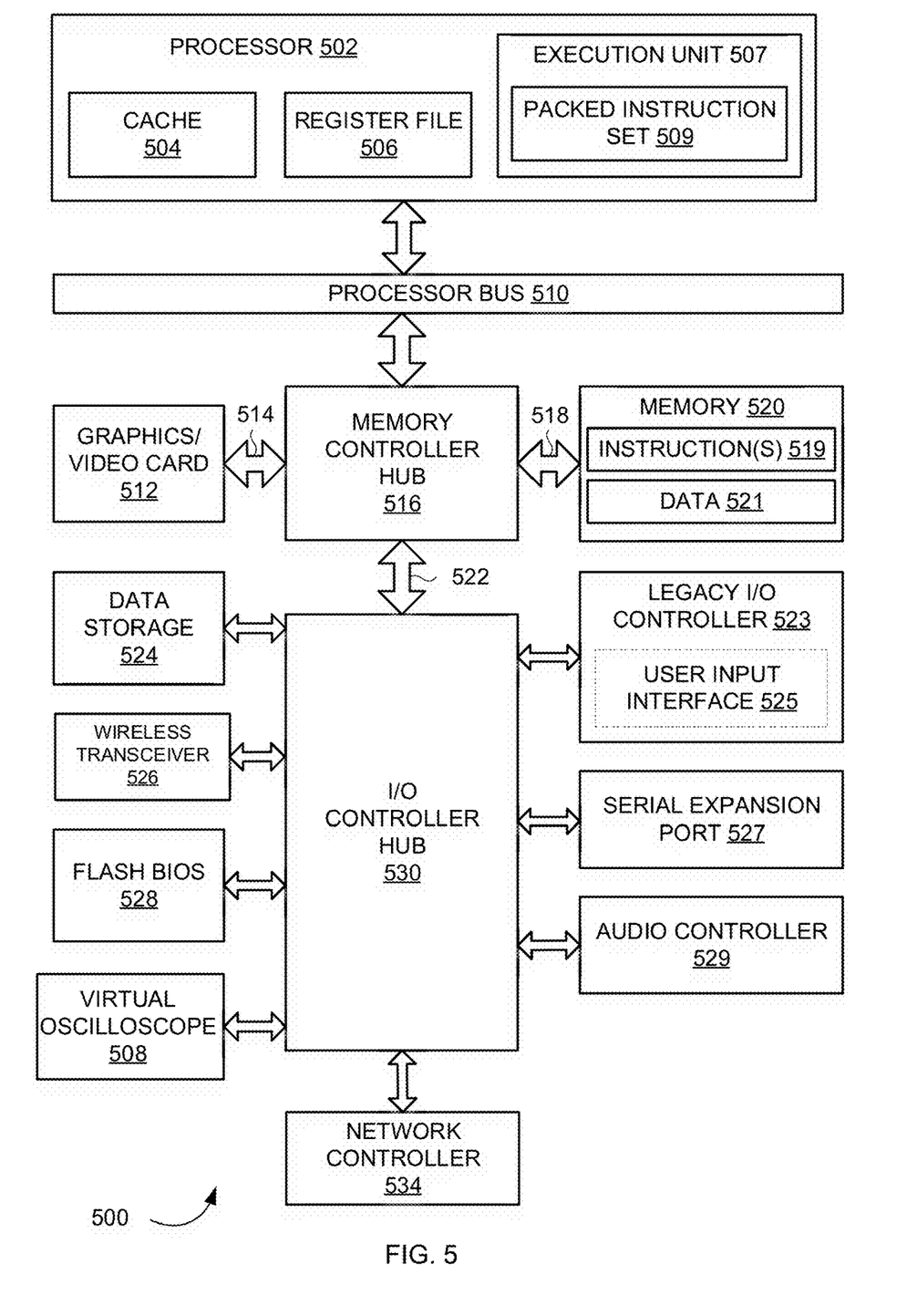
FIG. 5 illustrates an example computer system including an on-chip virtual oscilloscope using a high-speed receiver sampler readback, in accordance with at least some embodiments.

FIG. 5 illustrates a computer system 500 including an on-chip virtual oscilloscope using a high-speed receiver sampler readback, in accordance with at least one embodiment. In at least one embodiment, computer system 500 may be a system with interconnected devices and components, an SOC, or some combination. In at least one embodiment, computer system 500 is formed with a processor 502 that may include execution units to execute an instruction. In at least one embodiment, computer system 500 may include, without limitation, a component, such as a processor 502 to employ execution units including logic to perform algorithms for processing data. In at least one embodiment, computer system 500 may include processors, such as PENTIUM® Processor family, Xeon™, Itanium®, XScale™ and/or StrongARM™, Intel® Core™, or Intel® Nervana™ microprocessors available from Intel Corporation of Santa Clara, Calif., although other systems (including PCs having other microprocessors, engineering workstations, set-top boxes and like) may also be used. In at least one embodiment, computer system 500 may execute a version of WINDOWS' operating system available from Microsoft Corporation of Redmond, Wash., although other operating systems (UNIX and Linux, for example), embedded software, and/or graphical user interfaces, may also be used.

In at least one embodiment, computer system 500 may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor (DSP), an SoC, network computers ("NetPCs"), set-top boxes, network hubs, wide area network ("WAN") switches, or any other system that may perform one or more instructions. In an embodiment, computer system 500 may be used in devices such as graphics processing units (GPUs), network adapters, central processing units, and network devices such as switch (e.g., a high-speed direct GPU-to-GPU interconnect such as the NVIDIA GH100 NVLINK or the NVIDIA Quantum 2 64 Ports InfiniBand NDR Switch).

In at least one embodiment, computer system 500 may include, without limitation, processor 502 that may include, without limitation, one or more execution units 507 that may be configured to execute a Compute Unified Device Architecture ("CUDA") (CUDA® is developed by NVIDIA Corporation of Santa Clara, Calif.) program. In at least one embodiment, a CUDA program is at least a portion of a software application written in a CUDA programming language. In at least one embodiment, computer system 500 is a single processor desktop or server system. In at least one embodiment, computer system 500 may be a multiprocessor system. In at least one embodiment, processor 502 may include, without limitation, a CISC microprocessor, a RISC microprocessor, a VLIW microprocessor, a processor implementing a combination of instruction sets, or any other processor device, such as a digital signal processor, for example. In at least one embodiment, processor 502 may be coupled to a processor bus 510 that may transmit data signals between processor 502 and other components in computer system 500.

In at least one embodiment, processor 502 may include, without limitation, a Level 1 ("L1") internal cache memory ("cache") 504. In at least one embodiment, processor 502 may have a single internal cache or multiple levels of internal cache. In at least one embodiment, cache memory may reside external to processor 502. In at least one embodiment, processor 502 may also include a combination of both internal and external caches. In at least one embodiment, a register file 506 may store different types of data in various registers including, without limitation, integer registers, floating point registers, status registers, and instruction pointer register.

In at least one embodiment, execution unit 507, including, without limitation, logic to perform integer and floating point operations, also resides in processor 502. Processor 502 may also include a microcode ("ucode") read only memory ("ROM") that stores microcode for certain macro instructions. In at least one embodiment, execution unit 507 may include logic to handle a packed instruction set 509. In at least one embodiment, by including packed instruction set 509 in an instruction set of a general-purpose processor 502, along with associated circuitry to execute instructions, operations used by many multimedia applications may be performed using packed data in a general-purpose processor 502. In at least one embodiment, many multimedia applications may be accelerated and executed more efficiently by using full width of a processor's data bus for performing operations on packed data, which may eliminate a need to transfer smaller units of data across a processor's data bus to perform one or more operations one data element at a time.

In at least one embodiment, an execution unit may also be used in microcontrollers, embedded processors, graphics devices, DSPs, and other types of logic circuits. In at least one embodiment, computer system 500 may include, without limitation, a memory 520. In at least one embodiment, memory 520 may be implemented as a DRAM device, an SRAM device, flash memory device, or other memory devices. Memory 520 may store instruction(s) 519 and/or data 521 represented by data signals that may be executed by processor 502.

In at least one embodiment, a system logic chip may be coupled to a processor bus 510 and memory 520. In at least one embodiment, the system logic chip may include, without limitation, a memory controller hub ("MCH") 516, and processor 502 may communicate with MCH 516 via processor bus 510. In at least one embodiment, MCH 516 may provide a high bandwidth memory path 518 to memory 520 for instruction and data storage and for storage of graphics commands, data, and textures. In at least one embodiment, MCH 516 may direct data signals between processor 502, memory 520, and other components in computer system 500 and to bridge data signals between processor bus 510, memory 520, and a system I/O 522. In at least one embodiment, a system logic chip may provide a graphics port for coupling to a graphics controller. In at least one embodiment, MCH 516 may be coupled to memory 520 through high bandwidth memory path 518, and graphics/video card 512 may be coupled to MCH 516 through an Accelerated Graphics Port ("AGP") interconnect 514.

In at least one embodiment, computer system 500 may use system I/O 522 that is a proprietary hub interface bus to couple MCH 516 to I/O controller hub ("ICH") 530. In at least one embodiment, ICH 530 may provide direct connections to some I/O devices via a local I/O bus. In at least one embodiment, a local I/O bus may include, without limitation, a high-speed I/O bus for connecting peripherals to memory 520, a chipset, and processor 502. Examples may include, without limitation, an audio controller 529, a firmware hub ("flash BIOS") 528, a wireless transceiver 526, a data storage 524, a legacy I/O controller 523 containing a user input interface 525 and a keyboard interface, a serial expansion port 527, such as a USB, and a network controller 534. Data storage 524 may comprise a hard disk drive, a floppy disk drive, a CD-ROM device, a flash memory device, or other mass storage device.

In an embodiment, the computer system 500 includes an on-chip virtual oscilloscope 508. In such an embodiment, the on-chip virtual oscilloscope 508 may measure an amplitude of a signal received at computing system 500 at various timing values (e.g., based on a phase interpolator code). In an embodiment, the on-chip virtual oscilloscope 508 may enable the computing system 500 to characterize the wireless transceiver 526 response. In some examples, components of communication systems 100, 145, and device 200 may be included in virtual oscilloscope 508 as described with reference to FIGS. 1A, 1B, and 2.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit the disclosure to a specific form or forms disclosed, but on the contrary, the intention is to cover all modifications, alternative constructions, and equivalents falling within the spirit and scope of the disclosure, as defined in appended claims.

Use of terms "a" and "an" and "the" and similar referents in the context of describing disclosed embodiments (especially in the context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitations of ranges of values herein are merely intended to serve as a shorthand method of referring individually to each separate value falling within the range, unless otherwise indicated herein, and each separate value is incorporated into the specification as if it were individually recited herein. In at least one embodiment, the use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but subset and corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in an illustrative example of a set having three members, conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). In at least one embodiment, the number of items in a plurality is at least two, but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in the form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause a computer system to perform operations described herein. In at least one embodiment, a set of non-transitory computer-readable storage media comprises multiple non-transitory computer-readable storage media and one or more of individual non-transitory storage media of multiple non-transitory computer-readable storage media lack all of the code while multiple non-transitory computer-readable storage media collectively store all of the code. In at least one embodiment, executable instructions are executed such that different instructions are executed by different processors.

Accordingly, in at least one embodiment, computer systems are configured to implement one or more services that singly or collectively perform operations of processes described herein and such computer systems are configured with applicable hardware and/or software that enable the performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

All references, including publications, patent applications, and patents, cited herein are hereby incorporated by reference to the same extent as if each reference were individually and specifically indicated to be incorporated by reference and were set forth in its entirety herein.

In description and claims, terms "coupled" and "connected," along with their derivatives, may be used. It should be understood that these terms may not be intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, the term "processor" may refer to any device or portion of a device that processes electronic data from registers and/or memory and transform that electronic data into other electronic data that may be stored in registers and/or memory. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as the system may embody one or more methods and methods may be considered a system.

In the present document, references may be made to obtaining, acquiring, receiving, or inputting analog or digital data into a subsystem, computer system, or computer-implemented machine. In at least one embodiment, the process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or inter-process communication mechanism.

Although descriptions herein set forth example embodiments of described techniques, other architectures may be used to implement described functionality, and are intended to be within the scope of this disclosure. Furthermore, although specific distributions of responsibilities may be defined above for purposes of description, various functions and responsibilities might be distributed and divided in different ways, depending on circumstances.

Furthermore, although the subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A system comprising:
a transmitter to transmit a digital output comprising a set of bits corresponding to a pattern, wherein the pattern is associated with a signal having one or more levels;
a receiver coupled with the transmitter, the receiver to:
receive the set of bits;
generate a first plurality of digital values from a first portion of the set of bits, each digital value of the first plurality of digital values generated at a first timing value and a plurality of reference voltages, wherein a reference voltage of the plurality of reference voltages is incremented based at least in part on generating a digital value of the first plurality of digital values;
generate a second plurality of digital values from a second portion of the set of bits at a second timing value and the plurality of reference voltages, wherein the first timing value is incremented to the second timing value based at least in part on generating the first plurality of digital values; and
a controller coupled with the receiver and configured to determine an amplitude associated with the first plurality of digital values and the second plurality of digital values based at least in part on the receiver generating the first plurality of digital values and the second plurality of digital values.

2. The system of claim 1, wherein the signal is a single-level signal modulated by a non-return-to-zero (NRZ) modulation scheme.

3. The system of claim 1, wherein the signal is a multi-level signal modulated by a pulse-amplitude modulation (PAM) scheme.

4. The system of claim 1, wherein the reference voltage of the plurality of references voltages is further incremented based at least in part on a predetermined algorithm.

5. The system of claim 1, wherein the first timing value is incremented to the second timing value based at least in part on a phase interpolator (PI) code.

6. The system of claim 1, wherein the pattern comprises at least one of a step response, a pulse response, or a random pattern.

7. The system of claim 1, further comprising:
one or more registers to store the first plurality of digital values and the second plurality of digital values generated by the receiver.

8. The system of claim 1, wherein the controller is further to:
decode and process each digital value of the first plurality of digital values and the second plurality of digital values; and
generate a second pattern from the decoded digital values, wherein the second pattern corresponds to the pattern corresponding to the set of bits received at the receiver based at least in part on determining the amplitude associated with each digital value of the first plurality of digital values and the second plurality of digital values.

9. The system of claim 1, wherein the first timing value and second timing value correspond to a plurality of unit intervals (UI).

10. The system of claim 9, wherein a quantity of the plurality of UI is based at least in part on a type of modulation scheme associated with the signal.

11. The system of claim 1, further comprising:
a plurality of data pins, wherein the controller is further to:
determine crosstalk between a first data pin of the plurality of data pins and a second data pin of the plurality of data pins based at least in part on the determining the amplitude associated with each digital value of the first plurality of digital values and the second plurality of digital values.

12. A method, comprising:
receiving, at a receiver, a set of bits corresponding to a pattern, wherein the pattern is associated with a signal having one or more levels;
generating, at the receiver, a first plurality of digital values from a first portion of the set of bits, each digital value generated at a first timing value and a plurality of reference voltages, wherein a reference voltage of the plurality of reference voltages is incremented based at least in part on generating a digital value of the first plurality of digital values;
generating, at the receiver, a second plurality of digital values from a second portion of the set of bits at a second timing value and the plurality of reference voltages, wherein the first timing value is incremented to the second timing value based at least in part on generating the first plurality of digital values; and
determining an amplitude associated with the first plurality of digital values and the second plurality of digital values based at least in part on generating the first plurality of digital values and the second plurality of digital values.

13. The method of claim 12, further comprising:
determining an error associated with receiving the set of bits corresponding to the pattern; and
adjusting, at a driver coupled with the receiver, a clock frequency based at least in part on determining the error.

14. The method of claim 12, further comprising:
generating a third plurality of digital values from a third portion of the set of bits at a plurality of timing values, wherein the timing values are incremented based at least in part on generating a subset of digital values of the third plurality of digital values.

15. The method of claim 14, wherein the receiver generates the subset of digital values for each timing value of the plurality of timing values, and wherein each subset of digital values is generated based on incrementing the plurality of reference voltages.

16. The method of claim 15, wherein the first timing value and the second timing value are associated with a respective phase of a clock at the receiver.

17. The method of claim 14, wherein:
the reference voltages are incremented based at least in part on a variable algorithm; and
the first timing value, the second timing value, and the plurality of timing values are incremented based at least in part on a phase interpolator (PI) code.

18. The method of claim 12, wherein the signal is modulated by a non-return-to-zero (NRZ) modulation scheme having one level.

19. The method of claim 12, wherein the signal is modulated by a pulse-amplitude modulation (PAM) modulation scheme having two or more levels.

20. A device, comprising:

a receiver coupled with a link, the receiver to:
- receive a set of bits corresponding to a pattern, wherein the pattern is associated with a signal having one or more levels;

one or more samplers coupled with the receiver, the one or more samplers to:
- generate a first plurality of digital values from a first portion of the set of bits, each digital value generated at a first timing value and a plurality of reference voltages, wherein a reference voltage of the plurality of reference voltages is incremented based at least in part on generating a digital value of the first plurality of digital values;
- generate a second plurality of digital values from a second portion of the set of bits at a second timing value and the plurality of reference voltages, wherein the first timing value is incremented to the second timing value based at least in part on generating the first plurality of digital values; and a controller coupled with the one or more samplers, the controller to:
- determine an amplitude associated with the first plurality of digital values and the second plurality of digital values based at least in part on generating the first plurality of digital values and the second plurality of digital values.

\* \* \* \* \*